(12) United States Patent
Gandhi et al.

(10) Patent No.: US 6,390,560 B1
(45) Date of Patent: May 21, 2002

(54) MOTORIZED RIGID CHILD RESTRAINT SEAT ANCHOR

(75) Inventors: Umesh N. Gandhi, Farmington Hills; Christian Arthur Trager, Pinckney; Richard Monroe Sullivan, South Lyon, all of MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 09/584,503

(22) Filed: May 31, 2000

(51) Int. Cl.[7] .............................................. A47B 97/00
(52) U.S. Cl. ..................... 297/463.1; 297/253
(58) Field of Search .................. 297/253, 250.1, 297/463.1, 463.2; 16/404

(56) References Cited

U.S. PATENT DOCUMENTS

| | | | |
|---|---|---|---|
| 5,941,601 A | * | 8/1999 | Scott et al. |
| 6,030,046 A | * | 2/2000 | Dorow |
| 6,183,044 B1 | * | 2/2001 | Koyanagi et al. |
| 6,196,628 B1 | * | 3/2001 | Goy et al. |

* cited by examiner

Primary Examiner—Milton Nelson, Jr.
(74) Attorney, Agent, or Firm—Gifford, Krass, Groh, Sprinkle, Anderson & Citkowski, P.C.

(57) ABSTRACT

An adjustable anchor assembly is designed to provide an anchor for a child restraint seat at the intersection of a back cushion and a bottom cushion of a seat in the interior of an automobile. The adjustable anchor assembly includes a housing designed to mount to a support member adjacent the intersection of the back and bottom cushions. An anchor member has an attachment end designed to provide an attachment for a child restraint seat and a mounting end. An adjustment device adjustably interconnects the housing with the mounting end of the anchor member and is operable to change the distance between the housing and the anchor member.

10 Claims, 2 Drawing Sheets

MOTORIZED RIGID CHILD RESTRAINT SEAT ANCHOR

FIELD OF THE INVENTION

The present invention relates generally to automotive safety devices and, more specifically, to an adjustable anchor for a child restraint seat.

BACKGROUND OF THE INVENTION

Proper use of child restraint seats is of critical importance in the transport of children and infants. Traditionally, child restraint seats, such as infant seats and child seats, are placed on a passenger seat in an automobile and secured in place with the automobile seat belt. In recent years, there has been increased appreciation that child restraint seats are often not properly secured in the automotive interior, increasing the risk of injury to the child or infant. In an attempt to address this safety concern, there is an ongoing push to provide standardized anchors for securing child restraint seats. Such standardized anchors will provide a consistent and secure anchoring location to retain a child restraint seat. One approach has been to provide a rigid attachment anchor protruding from the point where the seat bottom cushion and back cushion intersect in an existing automobile interior. This loop provides a secure attachment for a child restraint system. While these anchors may provide safety benefits, they also have several potential drawbacks. First, there is some concern among safety experts that the rigid anchor may cause injury to the hip of an adult passenger seated in a seat with the anchor during a collision. Additionally, the anchors may be in the way when a user of the automobile attempts to slide either themselves or an object across the seat. Finally, the appearance of a rigid loop of metal projecting from the intersection of the seat bottom cushion and seat back cushion may be aesthetically undesirable.

SUMMARY OF THE INVENTION

The present invention provides the advantages of a rigid child restraint seat anchor while overcoming the disadvantages associated with current approaches. The invention is an adjustable anchor assembly to provide an anchor for a child restraint seat at the intersection of a back cushion and a bottom cushion of a seat in the interior of an automobile. The adjustable anchor assembly includes a housing which is designed to mount to a support member adjacent the intersection of the back and bottom cushions. An anchor member has an attachment end designed to provide an attachment for the child restraint seat and a mounting end. An adjustment device adjustably interconnects the housing with the mounting end of the anchor and is operable to change the distance between the housing and the anchor member. The anchor assembly according to the present invention may be retracted to a position such that the anchor point is hidden at the intersection of the seat cushions. When a user wishes to connect a child restraint seat, the anchor assembly may be adjusted so as to cause the attachment end of the anchor member to protrude from the intersection of the seat cushions so as to provide a secure attachment point.

DETAILED DESCRIPTION OF THE PREFERRED EMBODIMENTS

Figure 1:
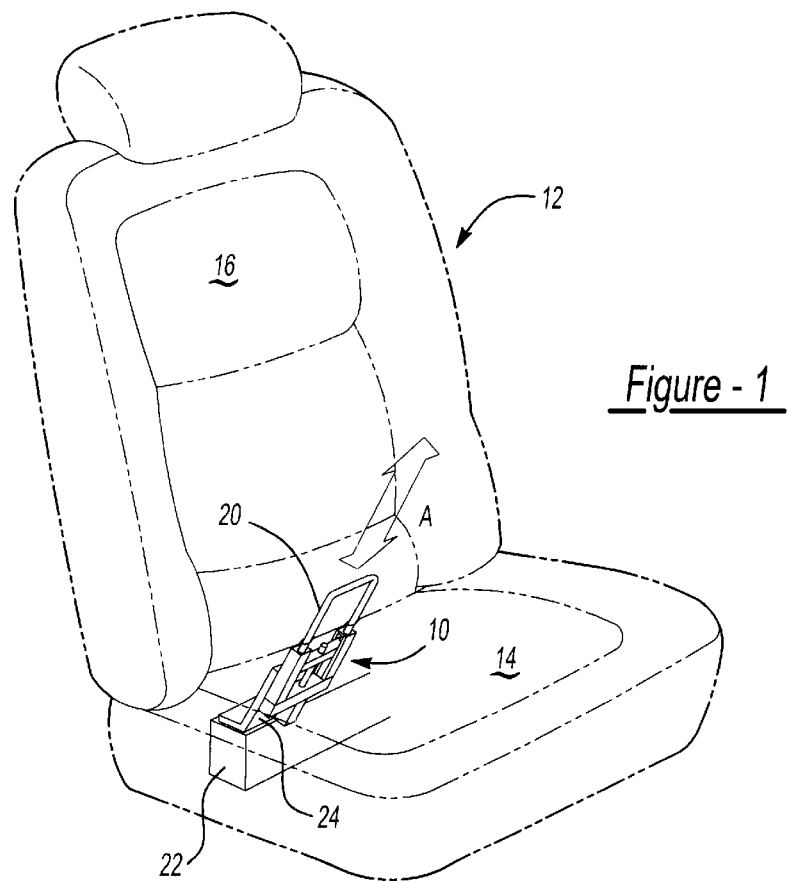
FIG. 1 is a perspective view of an automobile seat with an adjustable anchor assembly according to the present invention mounted at the intersection of the seat bottom cushion and back cushion.

Referring to FIG. 1, an adjustable anchor assembly according to the present invention is generally shown at 10. A typical automotive interior seat is shown in phantom lines at 12 and includes a seat bottom cushion 14 designed to support an adult passenger, and a seat back cushion 16 for the passenger to lean back against. As shown, the adjustable anchor assembly 10 is mounted adjacent the intersection of the bottom cushion 14 and back cushion 16. In the illustration, the anchor 10 is shown centered side to side with respect to the seat 12. However, as will be clear to those of skill in the art, the anchor 10 may be provided at other locations, such as at the left and right edges of the seat 12.

The anchor assembly 10 is designed to provide an attachment point for a child restraint seat so that the child restraint seat may be secured to the adult passenger seat 12. The anchor assembly 10 includes an anchor member 20 which is movable with respect to the remainder of the anchor assembly 10 as indicated by arrows A. In its extended position, as shown, the anchor member 20 protrudes from the intersection of the seat bottom cushion 14 and back cushion 16 to allow a child restraint system to be easily attached to the anchor member 20. The anchor member 20 may also be retracted with respect to the remainder of the anchor assembly 10, as will be described hereinbelow, so that the anchor member 20 resides below the intersection of the cushions 14 and 16 so it is out of the way and out of view.

As will be clear to those of skill in the art, it is important that the adjustable anchor assembly be mounted securely to a structural portion of the automobile. Obviously, vehicles vary widely in the location and configuration of structural members near the interior seating. The present invention may be easily adapted to mount to or interconnect with the structure of the automobile using a variety of brackets designed for the task. For purposes of illustration, a support member 22 is shown disposed below the seat 12 and a bracket 24 is shown interconnecting the support member 22 with the adjustable anchor assembly 10.

Figure 2:
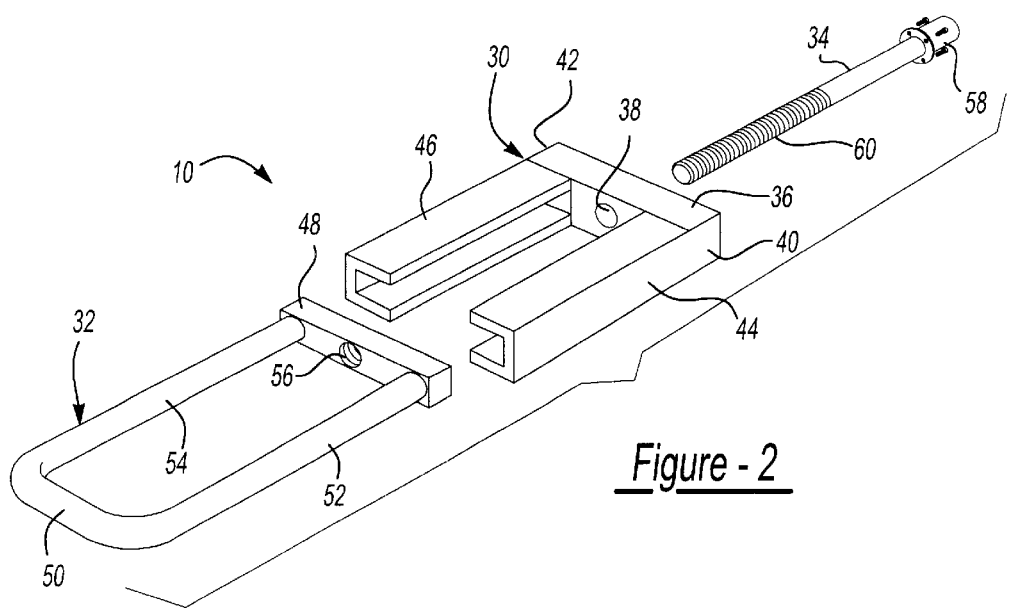
FIG. 2 is an exploded perspective view of a first embodiment of an anchor assembly according to the present invention.

Referring now to FIG. 2, the adjustable anchor assembly 10 is shown exploded to illustrate the various components. The adjustable anchor assembly 10 includes a housing 30 which is designed to be mounted to the structure of the automobile, an anchor member 32, and an adjusting screw rod 34 to adjust the position of the anchor member 32 relative to the housing 30. The housing 30 includes a base 36, which in the illustrated embodiment is a rectangular metal bar arranged transversely with a hole 38 defined through it near its center. For definitional purposes, the base 36 may be said to have its longest dimension running between a left end 40 and a right end 42, with left and right being defined from the vehicle perspective. A pair of spaced apart generally parallel guide arms 44 and 46 extend perpendicularly from the ends 40 and 42 of the base 36. As shown, each of the guide arms 44 and 46 is a C-channel with the opening of the channel facing the other guide arm. Therefore, the two guide arms 44 and 46 define inwardly opening channels.

The anchor member 32 has a mounting end 48 and an attachment end 50 interconnected by a pair of spaced apart but generally parallel side rails 52 and 54. The mounting end 48 is a transverse rectangular bar sized so as to slide into the inwardly opening channels in the guide arms 44 and 46. The mounting end 48 has a threaded aperture 56 defined therein, positioned so as to align with the hole 38 in the base 36 when the mounting end 48 is engaged with the guide arms 44 and 46. In the illustrated embodiment, the side rails 52 and 54 and the attachment end 50 are formed from a steel rod bent into a generally U-shaped configuration. The side rails 52 and 54 extend generally perpendicular from the ends of the mounting end 48 and the attachment end 50 is generally parallel to the mounting end 48. The attachment end 50 is sized and shaped so as to allow attachment of a child restraint seat. Basically, the attachment end 50 is a simple steel loop.

As shown, the anchor member 32 engages the housing 30 with the mounting end 48 sliding into the open channels of the guide arms 44 and 46. The mounting end 48 may be slid along the guide arms 44 and 46 so as to change the distance between the base 36 of the housing 30 and the mounting end 48 of the anchor member 32. The side rails 52 and 54 are also engaged with the guide aims 44 and 46 as the two pieces slide together.

Figure 3:
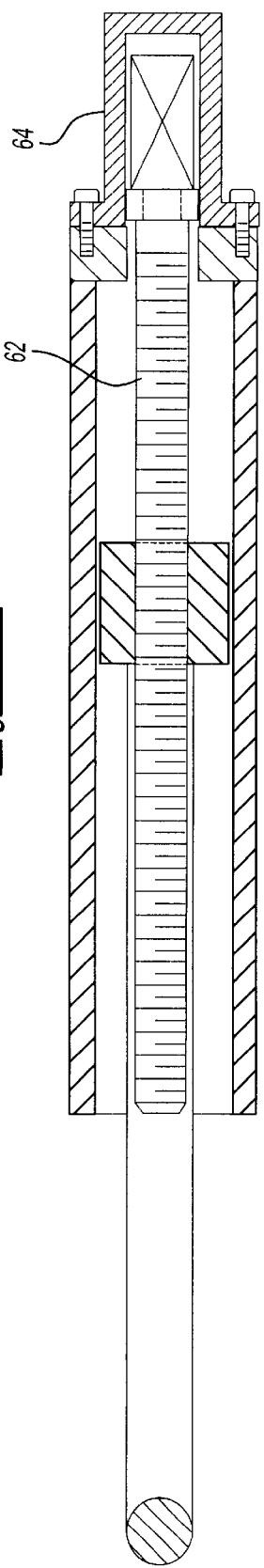
FIG. 3 is a longitudinal cross sectional view of an adjustable anchor assembly according to the present invention showing a first embodiment of a drive means for the adjusting device.
Figure 4:
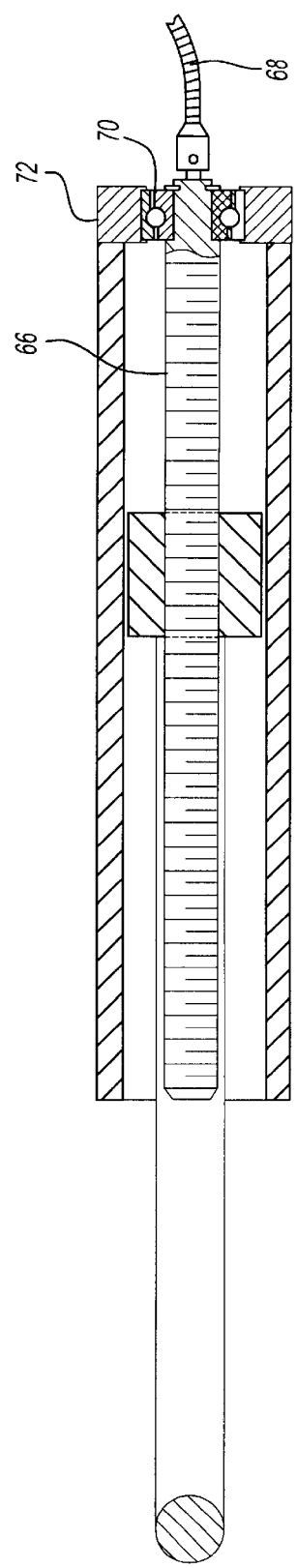
FIG. 4 is a longitudinal cross sectional view of an adjustable anchor assembly according to the present invention showing a second embodiment of a drive mechanism for the adjusting device.

The screw rod 34 serves as an adjustment device for adjustably interconnecting the housing 30 and the anchor member 32. The screw rod 34 has an enlarged head 58 at one of its ends and a threaded shaft 60 at its other end. The threaded shaft 60 is passed through the hole 38 in the base 36 of the housing 30 and engages the threaded aperture 56 in the mounting end 48 of the anchor member 32. By rotating the screw rod 34, the relative position of the anchor member 32 relative to the housing 30 may be adjusted. As will be clear to those of skill in the art, the screw rod 34 may be rotated in any of a variety of ways. For example, an electric motor may directly drive the screw rod or a remote power source may be interconnected with the screw rod via a flexible drive member. FIG. 3 shows a cross section of an embodiment wherein a screw rod 62 is driven by a motor 64 which is mounted to the underside of the base of the housing. As will be clear to those of skill in the art, the drive motor 64 may include gear reduction so as to allow the motor to easily rotate the screw rod 62. FIG. 4 shows an alternative embodiment where a screw rod 66 is interconnected with a flexible drive cable 68 which is interconnected with a remote drive means, not shown. As also shown in FIG. 4, the screw rod 66 may be supported by a bearing assembly 70 in the base 72. Other drive approaches will be clear to those of skill in the art.

Preferably, a control is mounted in the vehicle interior for controlling the adjustable anchor assembly. The control may also control more than anchor assembly.

According to the present invention, it is preferable that the thread pitch of the screw rod and in the aperture be chosen such that the screw rod cannot be easily back driven. That is, high levels of force on the anchor member should not cause the screw rod to rotate unless rotated by the drive means.

The various components of the present invention are sized and designed so as to withstand the loads expected during a crash situation. The materials are likewise chosen to meet all safety requirements. As will be clear to those of skill in the art, the illustrated embodiment may be altered in certain ways without departing from the scope or teaching of the present invention. For example, the design of the guide arms and the mounting end and side rails of the housing and anchor member may be altered so as to provide different forms of engagement. Also, the screw rod represents just one approach to adjustably interconnecting the housing and the anchor member. Instead, the anchor member could have its side rails extend through the base of the housing and terminate in threaded shafts. Then, two internally threaded members could engage the ends of the side rails so as to adjust the relative position between the side rails and the base of the housing. In the case where the side rails extend through the base of the housing, the ends of the side rails would serve as the mounting end of the anchor member. Other approaches will be clear to those of skill in the art. It is the following claims, including all equivalents, which define the scope of the present invention.

What is claimed is:

1. An adjustable anchor assembly for providing an anchor for a child restraint seat at an intersection of a back cushion and a bottom cushion of a seat in an interior of an automobile, said adjustable anchor assembly comprising:

an anchor member having a pair of rails interconnecting a mounting end and an attachment end configured to provide an attachment for the child restraint seat;

a housing configured for mounting to a support member adjacent the intersection of the back and bottom cushions; said housing having a base and a pair of generally parallel guide arms extending from said base, said rails of said anchor member slidably engaging said guide arms of said housing;

an adjustment device adjustably interconnecting said housing with said mounting end of said anchor member, said adjustment device operable to change a distance between said housing and said anchor member.

2. The adjustable anchor assembly of claim 1, wherein said adjustment device comprises a motorized screw rod.

3. The adjustable anchor assembly of claim 2, further comprising a remote power motor interconnected with said screw rod by a flexible drive cable.

4. The adjustable anchor assembly of claim 1, wherein each of said guide arms has an open channel facing the other of said guide arms, said rails of said anchor member being at least partially disposed in said channels.

5. An adjustable anchor assembly for providing an anchor for a child restraint seat at an intersection of a back cushion and a bottom cushion of a seat in an interior of an automobile, said adjustable anchor assembly comprising:

a housing configured for mounting to a support member adjacent the intersection of the back and bottom cushions, said housing comprising a base with a hole defined therethrough and a pair of spaced apart generally parallel guide arms extending from said base, each of said guide arms having an open channel facing the other of said guide arms;

an anchor member having an attachment end configured to provide an attachment for the child restraint seat and a mounting end with a threaded aperture defined therein, said anchor member further comprising a pair of spaced apart generally parallel side rails interconnecting said attachment end and said mounting end, said anchor member slidably engaging said housing such that at least a portion of each of said side rails is disposed in said open channels;

an adjustment device adjustably interconnecting said housing with said mounting end of said anchor member, said adjustment device comprising a threaded member passing through said hole in said base of said housing and engaging said threaded aperture in said mounting end of said anchor member, said threaded member operable to change a distance between said mounting end of said anchor member and said base of said housing.

6. An adjustable anchor assembly for providing an anchor for a child restraint seat at an intersection of a back cushion and a bottom cushion of a seat in an interior of an automobile, said adjustable anchor assembly comprising:

a housing configured for mounting to a support member adjacent the intersection of the back and bottom cushions, said housing having a base;

an anchor member having an attachment end configured to provide an attachment for the child restraint seat and a mounting end;

an adjustment device adjustably interconnecting said housing with said mounting end of said anchor member, said adjustment device having a screw rod driven by a motor operable to change a distance between said base of said housing and said mounting end of said anchor member.

7. The adjustable anchor assembly of claim 6, further comprising said power motor being interconnected with said screw rod by a flexible drive cable.

8. The adjustable anchor assembly of claim 6, wherein said anchor member comprises a pair of side rails interconnecting said attachment end and said mounting end.

9. The adjustable anchor assembly of claim 8, wherein said housing comprises a pair of generally parallel guide arms extending from said base, said side rails of said anchor member slidably engaging said guide arms of said housing.

10. The adjustable anchor assembly of claim 9, wherein each of said guide arms has an open channel facing the other of said guide arms, said side rails of said anchor member being at least partially disposed in said channels.

* * * * *